US008416752B2

(12) United States Patent
Watanabe

(10) Patent No.: US 8,416,752 B2
(45) Date of Patent: Apr. 9, 2013

(54) COMMUNICATION SYSTEM, COMMUNICATION TERMINAL, AND METHOD THEREFOR

(75) Inventor: Kazunari Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 12/333,504

(22) Filed: Dec. 12, 2008

(65) Prior Publication Data
US 2009/0180425 A1 Jul. 16, 2009

(30) Foreign Application Priority Data

Jan. 10, 2008 (JP) ................................. 2008-003640

(51) Int. Cl.
H04W 4/00 (2009.01)
H04L 12/26 (2006.01)
(52) U.S. Cl. ........ 370/338; 370/255; 370/252; 370/449; 709/223; 455/552.1
(58) Field of Classification Search .................. 370/328, 370/338, 445, 252, 254, 255, 401; 455/435.1, 455/41.2
See application file for complete search history.

(56) References Cited

U.S. PATENT DOCUMENTS

| 6,870,822 | B2 * | 3/2005 | Balogh | 370/332 |
|---|---|---|---|---|
| 7,224,938 | B2 * | 5/2007 | Shvodian | 455/41.2 |
| 7,573,855 | B2 * | 8/2009 | Hohl et al. | 370/338 |
| 7,636,343 | B2 * | 12/2009 | Mizukoshi | 370/338 |
| 7,801,100 | B2 * | 9/2010 | Agardh et al. | 370/338 |
| 7,941,177 | B2 * | 5/2011 | Kim | 455/552.1 |
| 2004/0166892 | A1 * | 8/2004 | Iizuka | 455/550.1 |
| 2004/0264427 | A1 * | 12/2004 | Jaakkola et al. | 370/338 |
| 2006/0171388 | A1 * | 8/2006 | Ikeda | 370/389 |
| 2006/0215621 | A1 * | 9/2006 | Abdel-Kader et al. | 370/338 |
| 2007/0047435 | A1 * | 3/2007 | Marples | 370/216 |
| 2007/0066304 | A1 * | 3/2007 | Lee | 455/436 |
| 2008/0025324 | A1 * | 1/2008 | Sawada | 370/400 |

* cited by examiner

Primary Examiner — Kwang B Yao
Assistant Examiner — Candal Elpenord
(74) Attorney, Agent, or Firm — Carter, DeLuca, Farrell & Schmidt LLP

(57) ABSTRACT

A communication system includes a first communication terminal configured to comply with a plurality of communication methods, and a second communication terminal that complies with any one of the communication methods, wherein the first communication terminal includes a network creating unit configured to transmit a notification signal including information about a network to create a network that complies with any one of the communication methods, a checking unit configured to check history information about a communication between the first communication terminal and the second communication terminal according to a notification signal including information about a network different from the network that has been created by the network creating unit, while the network creating unit has created the network, and a communication control unit configured to cause the first communication terminal to join the network created by the second communication terminal based on the history information.

16 Claims, 10 Drawing Sheets

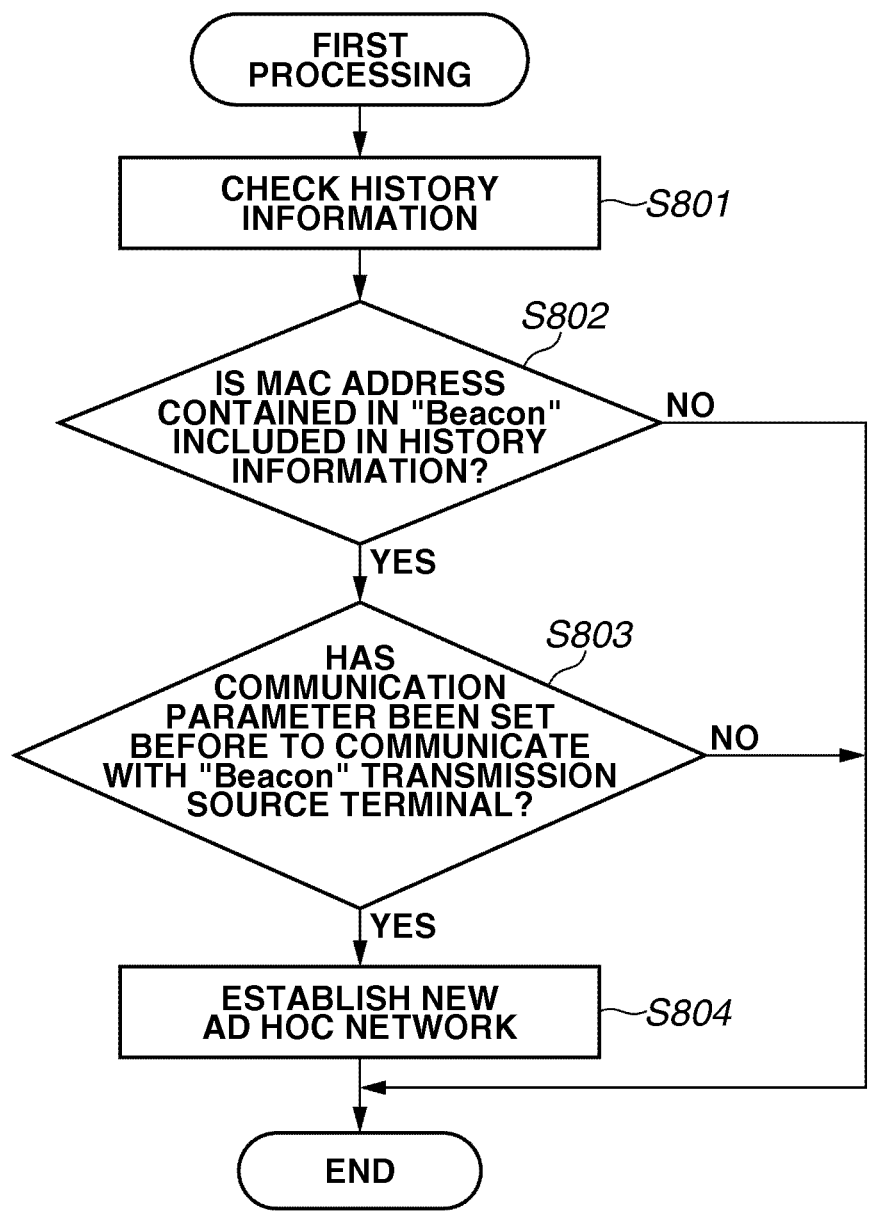

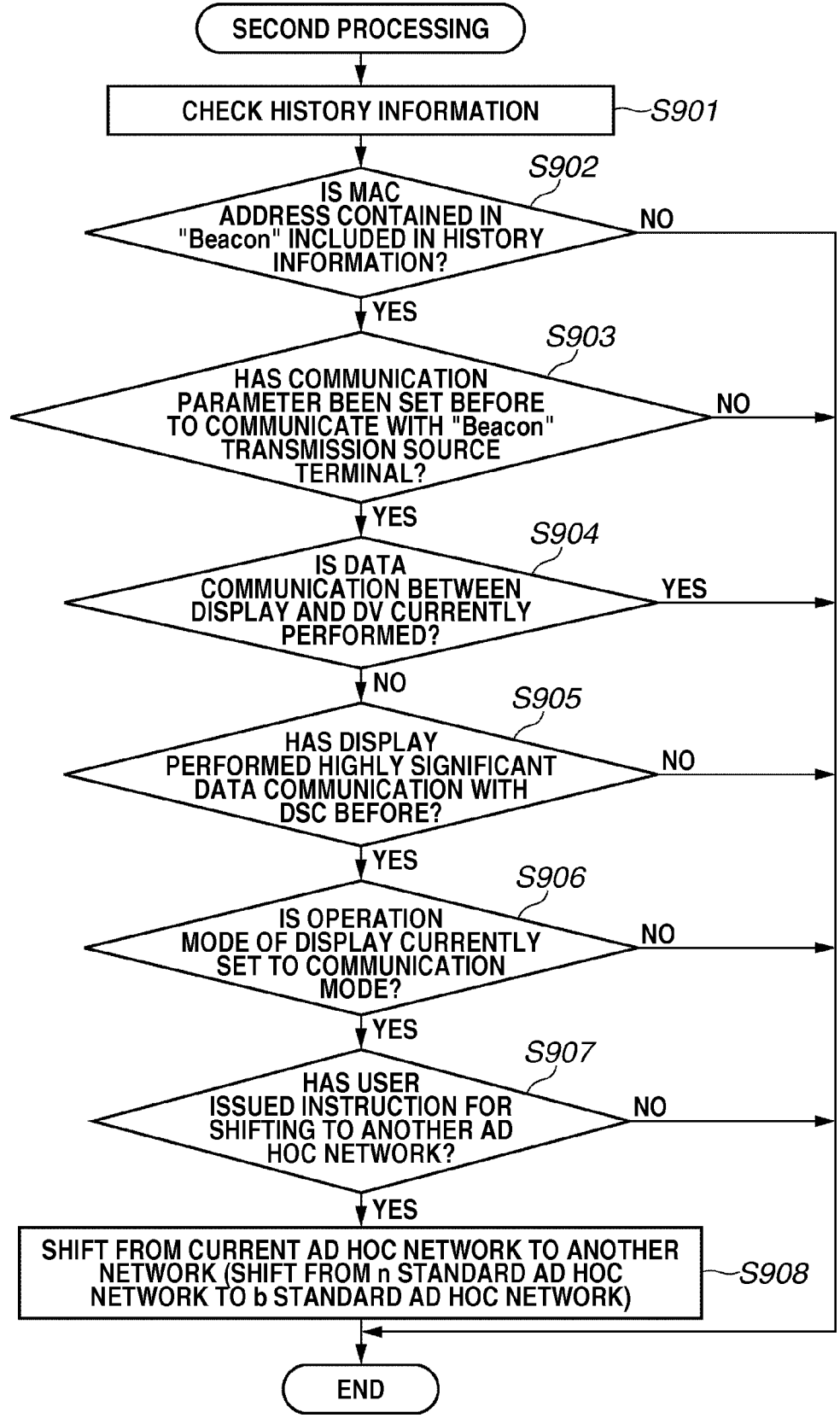

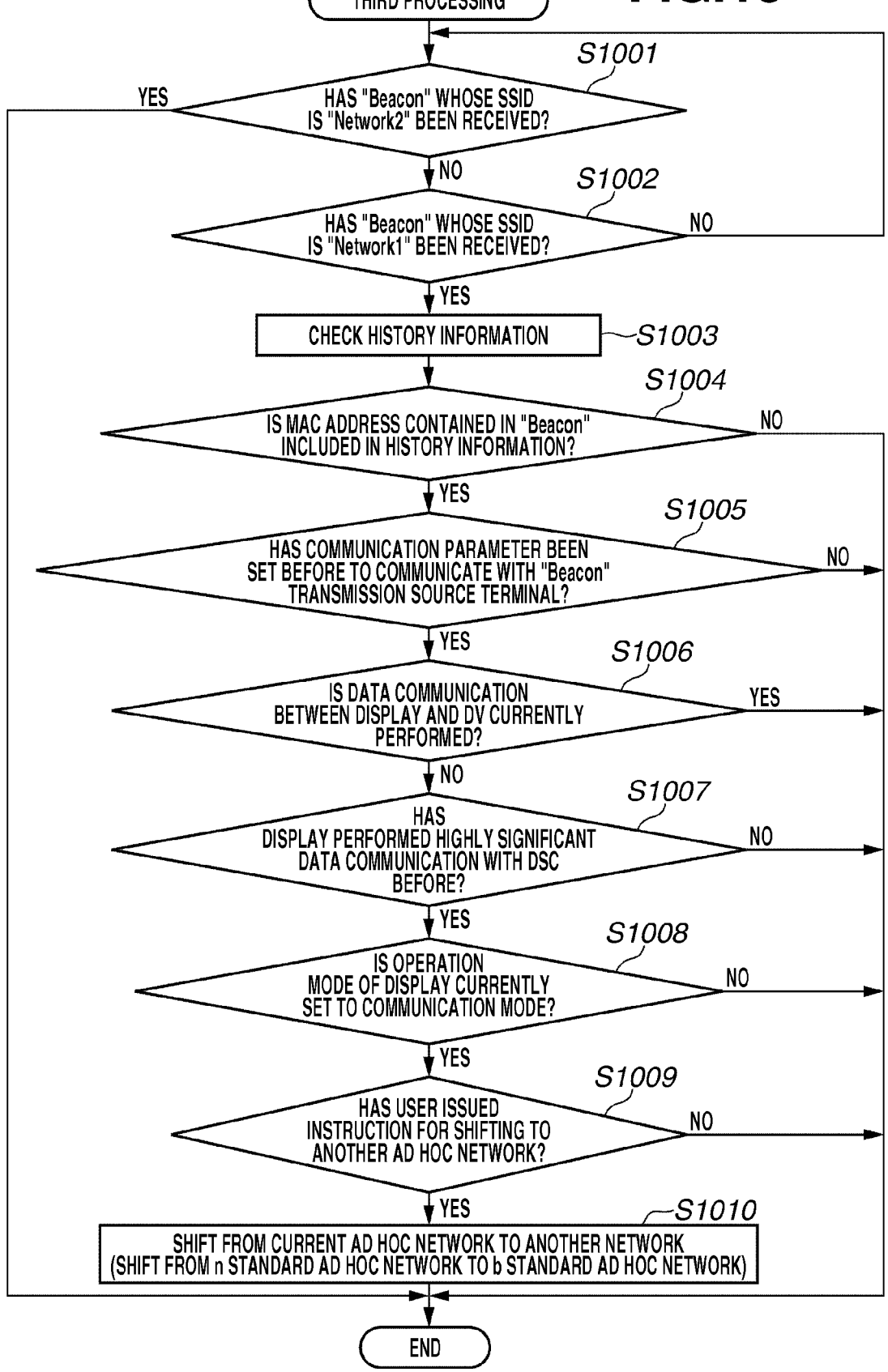

COMMUNICATION SYSTEM, COMMUNICATION TERMINAL, AND METHOD THEREFOR

BACKGROUND OF THE INVENTION

1. Field of the Invention

The present invention relates to a communication system, a communication terminal, and a method for performing communications among a plurality of communication terminals.

2. Description of the Related Art

In a wireless communication system, an infrastructure mode and an ad hoc mode are used. In the infrastructure mode, a plurality of wireless communication terminals communicates with one another via a base station or an access point (hereinafter simply referred to as an "AP"), while in the ad hoc mode, a plurality of wireless communication terminals directly communicates with one another by bypassing the AP.

In a network created by using the ad hoc mode (hereinafter simply referred to as an "ad hoc network"), a signal including information necessary for the wireless communication, which is referred to as a "beacon", is notified to a peripheral wireless communication terminal. The "beacon" signal is transmitted to and received by each terminal at random. Thus, the wireless communication terminals can operate in synchronization with one another and data communication among the terminals is performed.

Conventional processing for performing a wireless connection in the ad hoc network includes processing for transmitting (broadcast-transmitting) a search signal called "probe request" to all terminals on the network and processing for receiving a response called "probe response". More specifically, the following processing is conventionally performed in performing a data communication among a plurality of wireless communication terminals.

If a wireless communication terminal has not received a "probe response", although the wireless communication terminal has transmitted a "probe request" for a predetermined number of times, then the wireless communication terminal starts transmitting the signal "beacon".

More specifically, in this case, the wireless communication terminal itself creates an ad hoc network and starts transmitting a notification signal to peripheral wireless communication terminals. Then, if the wireless communication terminal has received a "probe request", the communication among the wireless communication terminals starts. Thus, the data communication in the ad hoc network created in the above-described manner is implemented.

On the other hand, in the case where the wireless communication terminal has received a "probe response" after a "probe request" has been transmitted, the wireless communication terminal that has transmitted the "probe request" acquires synchronization information or transmission rate information about the network according to the received response signal.

Then, communications among the wireless communication terminals are started and the wireless communication terminal joins the existing ad hoc network. Thus, the data communications with the peripheral wireless communication terminals are implemented (in compliance with Institute of Electrical and Electronic Engineers (IEEE) STD 802.11-1999 Part 11: Wireless Local Area Network (LAN) Medium Access Control (MAC) and Physical Layer (PHY) Specifications).

Here, a case is described where a wireless communication terminal joins an ad hoc network created by and including a plurality of other wireless communication terminals that complies with a communication standard (hereinafter simply referred to as a "communication method" where necessary) different from the communication method that the wireless communication terminal joining the ad hoc network complies with.

For example, suppose that a plurality of wireless communication terminals, which complies with the IEEE802.11n standard, has created an ad hoc network, and that a data communication among the wireless communication terminals at a unique high transmission rate defined by the IEEE802.11n standard has been performed. Then, a wireless communication terminal A, which complies with only the IEEE802.11b standard, has issued a request for joining the ad hoc network.

In this case, at first, the wireless communication terminal A transmits a "probe request". Then, the wireless communication terminal A receives a response to the "probe request", namely, a "probe response".

In the transmission rate information included in the "probe response", a transmission rate that the wireless communication terminal A does not comply with is defined.

This state indicates that the wireless communication terminal A has issued a request for joining the ad hoc network created by and including a plurality of wireless communication terminals that complies with a communication method different from the communication method that the wireless communication terminal A complies with. Accordingly, in this case, because the wireless communication terminal A does not have a capacity to perform the data communication at the high transmission rate defined by the communication method used by the wireless communication terminals, the wireless communication terminal A cannot join the ad hoc network.

SUMMARY OF THE INVENTION

The present invention is directed to a technique for enabling reconstructing an existing network by using a communication history even in the case where a communication terminal that does not comply with a communication method of the network has issued a request for joining the existing network.

According to an aspect of the present invention, a communication system includes a first communication terminal configured to comply with a plurality of communication methods, and a second communication terminal configured to comply with any one of the communication methods that the first communication terminal complies with. The first communication terminal includes a network creating unit configured to transmit a notification signal including information about a network to create a network that complies with at least one of the communication methods that the first communication terminal complies with, a checking unit configured to check history information about a communication between the first communication terminal and the second communication terminal according to a notification signal, which includes information about a network different from the network that has been created by the network creating unit and is sent from the second communication terminal, while the network creating unit has created the network, and a communication control unit configured to cause the first communication terminal to join the network created by the second communication terminal based on the history information checked by the checking unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 8 is a flow chart illustrating an example of processing in step S504 of FIG. 5 according to an exemplary embodiment of the present invention.

FIG. 9 is a flow chart illustrating an example of processing in step S507 of FIG. 5 according to an exemplary embodiment of the present invention.

FIG. 10 is a flow chart illustrating an example of processing in step S511 of FIG. 5 according to an exemplary embodiment of the present invention.

DETAILED DESCRIPTION OF THE EMBODIMENTS

Various exemplary embodiments, features, and aspects of the present invention will be described in detail below with reference to the drawings. It is to be noted that the relative arrangement of the components, the numerical expressions, and numerical values set forth in these embodiments are not intended to limit the scope of the present invention.

Now, a communication system, a communication terminal, a method, and a program according to an exemplary embodiment of the present invention will be described in detail below with reference to attached drawings. Note that in the present exemplary embodiment, a case is particularly described in which the present exemplary embodiment is applied in a network where a wireless communication is performed in compliance with the IEEE 802.11 standard or various other standards related thereto including the IEEE802.11n standard.

However, the scope of application of the present invention is not limited to the method using the IEEE 802.11 standard and the IEEE802.11n standard, which is the extended standard thereof. That is, the present invention can also be extensively applied to a communication control method that complies with a communication protocol different from the IEEE 802.11 standard and the IEEE802.11n standard.

Note that a terminal that complies with a communication by a plurality of communication methods (a first communication terminal) and another terminal that complies with a communication by any one of methods out of the communication methods that the first communication terminal complies with (a second communication terminal) are described as exemplary communication terminals according to the present exemplary embodiment. As examples of the first communication terminals, a digital video camera and a display that comply with the IEEE 802.11 related standard including the IEEE802.11b standard and the IEEE802.11n standard are described. On the other hand, as an example of the second communication terminal, a digital still camera that complies with only the IEEE802.11b standard is described.

Figure 1:
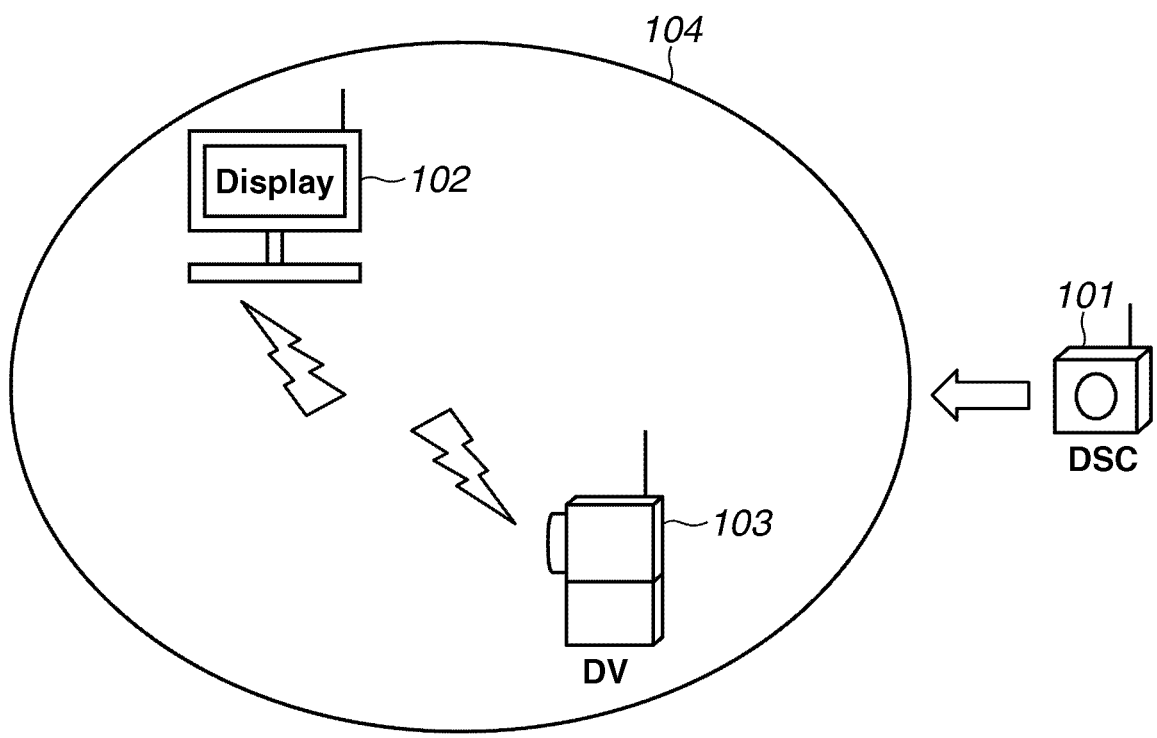
FIG. 1 illustrates an exemplary configuration of the entire communication system according to an exemplary embodiment of the present invention.

FIG. 1 illustrates an exemplary configuration of the entire communication system according to an exemplary embodiment of the present invention. The communication system is constituted by an ad hoc mode network.

Referring to FIG. 1, a digital still camera 101 (hereinafter simply referred to as a "DSC 101") complies with the IEEE802.11b standard only. A display 102 complies with the IEEE 802.11 related standard including the IEEE802.11b standard and the IEEE802.11n standard. A digital video camera 103 (hereinafter simply referred to as a "DV 103") complies with the IEEE 802.11 related standard including the IEEE802.11b standard and the IEEE802.11n standard.

In the example illustrated in FIG. 1, the area of the ad hoc network is schematically illustrated with an ellipse 104 including the display 102 and the DV 103. That is, the inside of the network area indicated by the ellipse 104 in FIG. 1 is the area of the ad hoc network, while the outside thereof is not the ad hoc network area.

In FIG. 1, the display 102 and the DV 103 have already created the ad hoc network 104 in compliance with the IEEE802.11n standard at a uniquely set high transmission rate defined thereby. In the network 104, the display 102 and the DV 103 transmit and receive video data.

Then, the DSC 101, which does not comply with the IEEE802.11n standard, has issued a request for joining the network area 104 to perform data communication with the display 102. That is, the DSC 101 issues a request for joining the network 104, where the communication method that the DSC 101 does not comply with is used.

Now, an exemplary functional configuration of each of the wireless communication terminals, namely, the DSC 101, the display 102, and the DV 103 illustrated in FIG. 1, will be described in detail below with reference to FIGS. 2 through 4.

Figure 2:
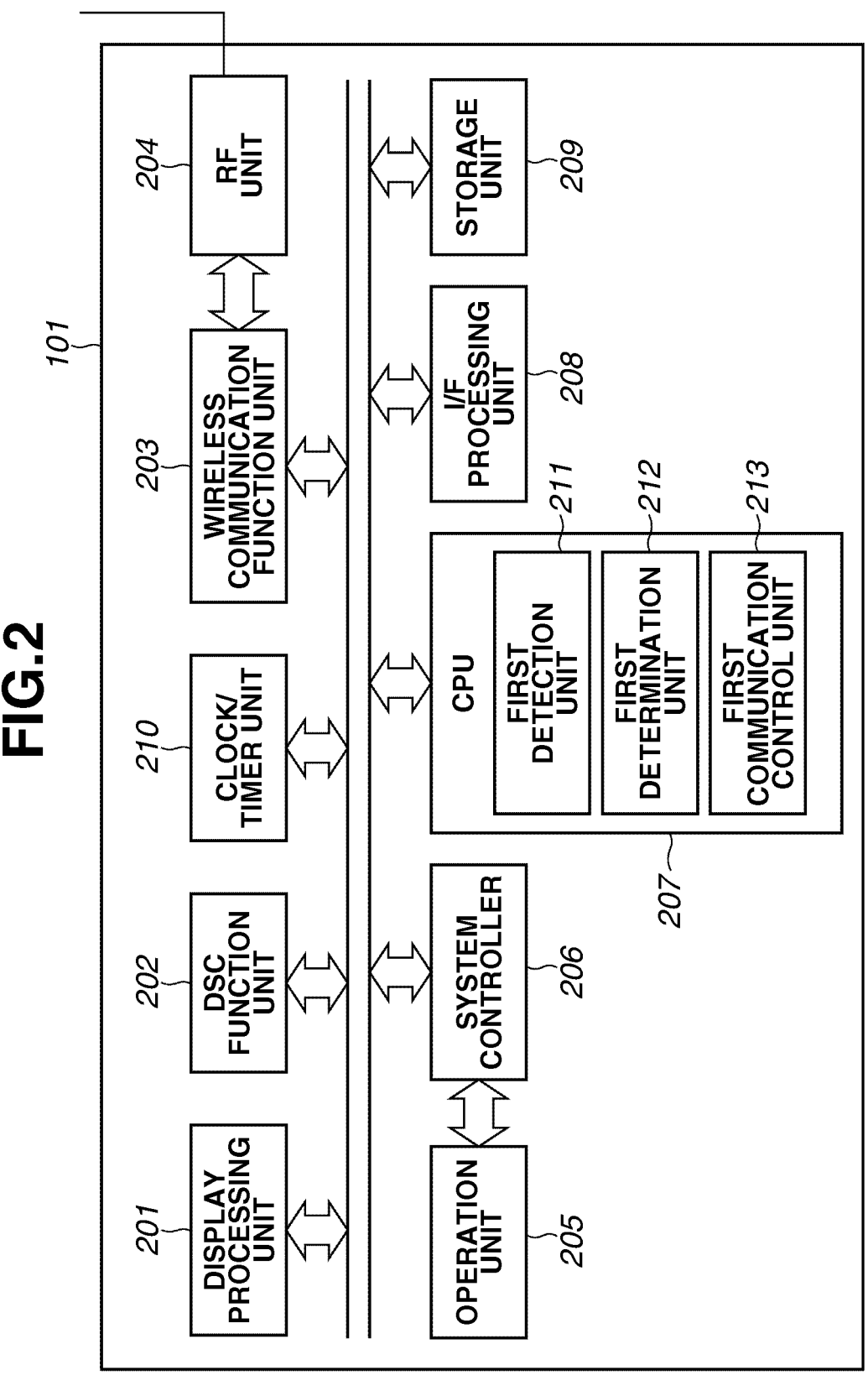
FIG. 2 illustrates an exemplary functional configuration of a digital still camera illustrated in FIG. 1 according to an exemplary embodiment of the present invention.

FIG. 2 illustrates an exemplary configuration of the DSC 101. FIG. 3 illustrates an exemplary configuration of the display 102. FIG. 4 illustrates an exemplary configuration of the DV 103.

Note that the DSC 101, the display 102, and the DV 103 have substantially the same configuration. Accordingly, in the present exemplary embodiment, the DSC 101 illustrated in FIG. 2 will be described below as a representative example.

A display processing unit 201 displays various information on a liquid crystal display (LCD) or a light-emitting diode (LED) display and controls the information to be displayed thereon.

A DSC function unit 202 actually captures an image and provides functions unique to the DSC 101.

A wireless communication function unit 203 complies with only the IEEE802.11b standard and performs a wireless communication therewith.

A radio frequency (RF) unit 204, transmits and receives a wireless signal to and from another wireless communication apparatus. The wireless communication function unit 203 and the RF unit 204 operate in cooperation to create a network, for example.

Note that in creating a network, a notification signal, so-called "beacon", including network information such as a service set identifier (SSID), is transmitted.

An operation unit 205 is connected to a central processing unit (CPU) 207 via a system controller 206. The display processing unit 201 and the operation unit 205 function as a user interface (I/F) of the DSC 101 according to the present exemplary embodiment.

Note that the CPU 207, for example, performs primary control to execute the above-described processing functions (processing modules). Each program (e.g., a communication processing program) controlled by the CPU 207 is stored on a storage unit 209.

The CPU 207 includes a first detection unit 211, a first determination unit 212, and a first communication control unit 213 as its functional configuration.

The first detection unit 211 includes a function for detecting whether the signal received as a notification from the RF unit 204 and the wireless communication function unit 203 is the "beacon" signal.

The first detection unit 211 further includes a function for detecting information that identifies a transmission source (for example, a Media Access Control (MAC) address), which is contained in the detected "beacon" signal. With the above-described function, the transmission source wireless communication terminal can be identified.

According to the information transmitted from each of the above-described processing functions, the first determination unit 212 determines whether to continue or discontinue the ad hoc network, whether to create a new ad hoc network, and whether to shift to another ad hoc network.

Note that the above-described determination processing performed by the first determination unit 212 includes each determination processing illustrated in FIG. 8 (i.e., processing illustrated in a rhombic rectangle and indicating a condition for each determination processing).

The first communication control unit 213 controls the wireless communication performed by the RF unit 204 and the wireless communication function unit 203. The first communication control unit 213 performs the control of wireless communication based on a determination made by the first determination unit 212.

An I/F processing unit 208 performs processing about various I/F. The storage unit 209 is constituted by a random access memory (RAM) or a flash read-only memory (ROM) and stores various information. For example, the storage unit 209 stores information about a setting for the wireless communication, information for identifying the transmission source of the received "beacon" (e.g., the MAC address), and history information.

The history information includes time information for identifying the date and time of communication and communication destination identification information for identifying the destination of communication. Furthermore, the history information includes operation history information including history information about operations performed by the user and type information about the transmitted data.

Furthermore, data processed by the CPU 207 is written on and read from the storage unit 209.

The clock/timer unit 210 includes a clock function for measuring the date and time and a timer function for measuring a predetermined time interval under control of the CPU 207.

The DSC 101 has the above-described functional configuration. As described above, the display 102 and the DV 103 illustrated in FIGS. 3 and 4 have the substantially the same configuration as that of the DSC 101.

For example, with respect to the display 102 (FIG. 3), a RF unit 304 corresponds to the RF unit 204 of the DSC 101. An I/F processing unit 308 corresponds to the I/F processing unit 208 of the DSC 101. A second detection unit 311 corresponds to the first detection unit 211 of the DSC 101. A second determination unit 312 corresponds to the first determination unit 212 of the DSC 101. A second communication control unit 313 corresponds to the first communication control unit 213 of the DSC 101. The above-described components of the display 102 operate to execute substantially the same functions as those described above with respect to the components of the DSC 101.

Furthermore, with respect to the DV 103 (illustrated in FIG. 4), in a similar way as described above, a RF unit 404 corresponds to the RF unit 204 of the DSC 101. An I/F processing unit 408 corresponds to the I/F processing unit 208 of the DSC 101. A third detection unit 411 corresponds to the first detection unit 211 of the DSC 101. A third determination unit 412 corresponds to the first determination unit 212 of the DSC 101. A third communication control unit 413 corresponds to the first communication control unit 213 of the DSC 101. The above-described components of the DV 103 operate to execute substantially the same functions as those described above with respect to the components of the DSC 101.

Note that the display 102 and the DV 103 are different from the DSC 101 described above with reference to FIG. 2 in the point that the display 102 and the DV 103 respectively have a function uniquely provided thereto. More specifically, the display 102 includes a display function unit 302, while the DV 103 includes a DV function unit 402, instead of the DSC function unit 202 of the DSC.

Furthermore, the display 102 and the DV 103 are different from the DSC 101 in the point that wireless communication function units 303 and 403 of the display 102 and the DV 103 comply with not only the IEEE802.11b standard but also the IEEE802.11n standard.

Next, processing performed to reconstruct an ad hoc network in the communication system illustrated in FIG. 1 according to the present exemplary embodiment will be described below with reference to FIGS. 5 through 10.

In the following description, a flow of processing will be described in which the DSC 101 has performed processing for joining (issued a request for joining) the ad hoc network created between the display 102 and the DV 103 at the transmission rate defined in the IEEE802.11n standard. Note that the DSC 101 complies with the communication performed in compliance with the IEEE802.11b standard, as described above.

Figure 5:
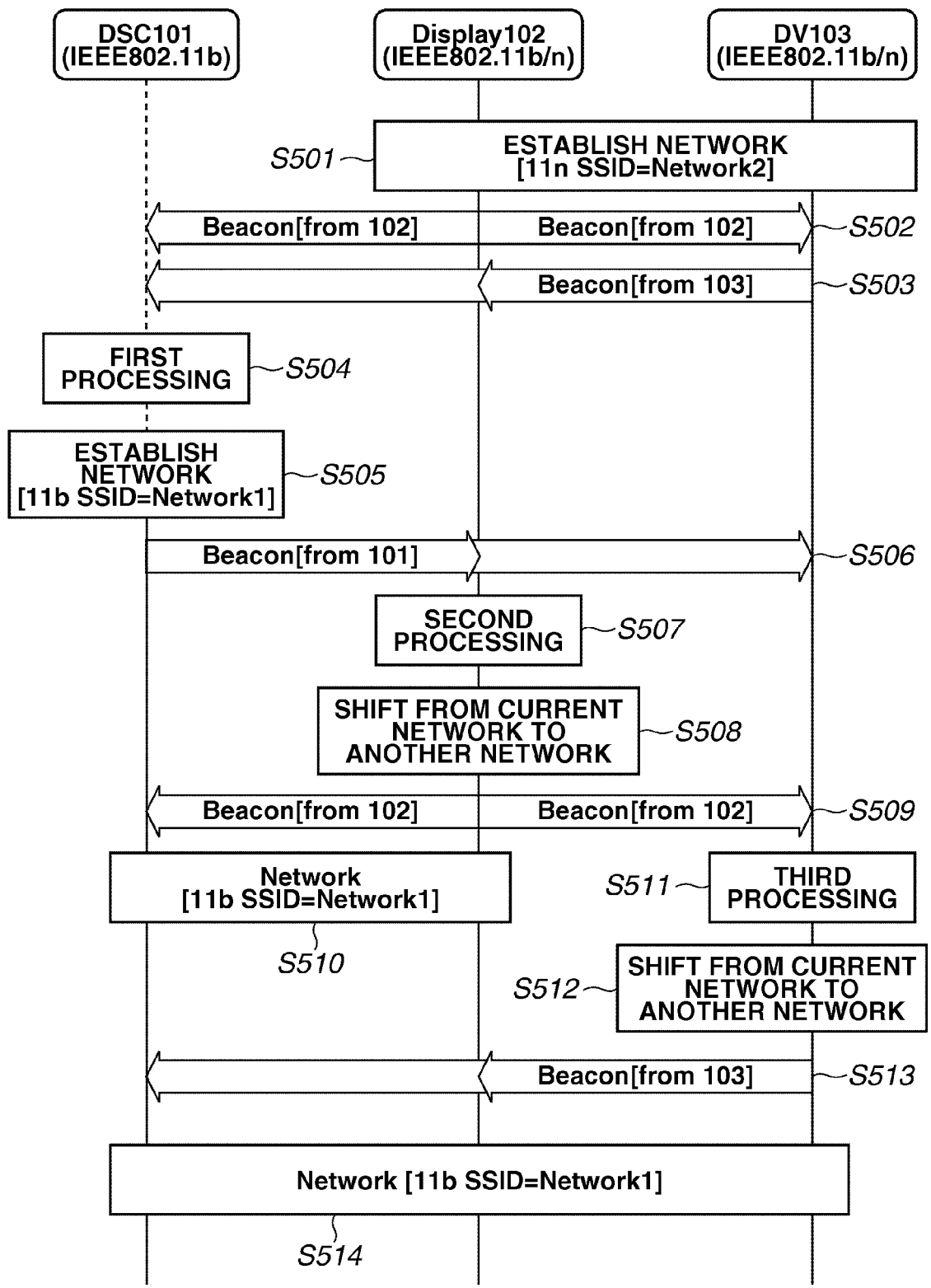
FIG. 5 illustrates an example of a flow of processing for reconstructing an ad hoc network in the communication system illustrated in FIG. 1 (Case 1) according to an exemplary embodiment of the present invention.
Figure 6:
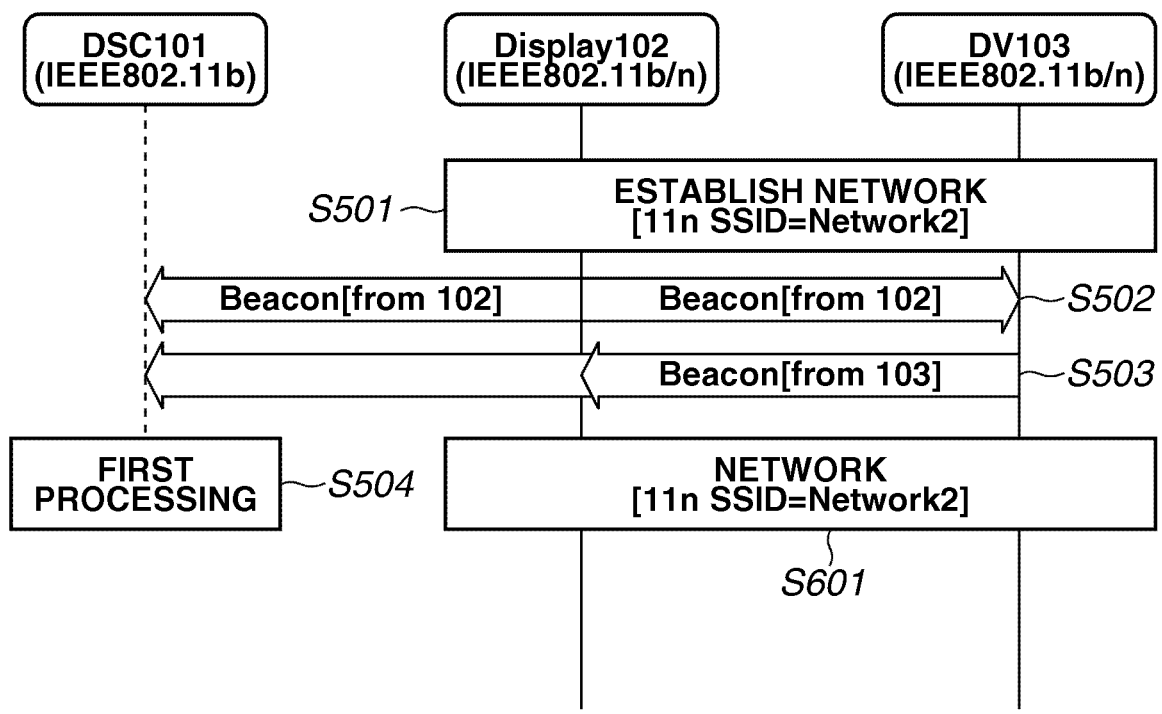
FIG. 6 illustrates an example of a flow of processing for reconstructing an ad hoc network in the communication system illustrated in FIG. 1 (Case 2) according to an exemplary embodiment of the present invention.

Referring to FIG. 5, in step S501, the display 102 and the DV 103 create an ad hoc network according to the transmission rate in compliance with the IEEE802.11n standard. The ad hoc network operates under SSID of "Network2", which is the ad hoc network created by the display 102 as described above.

The DV 103 joins the ad hoc network that has been created by the display 102. Thus, the network between the display 102 and the DV 103 is created. Note that the SSID is information indicating the name of the network.

In steps S502 and S503, the display 102 and the DV 103 notify the "beacon" signal.

In step S502, the DV 103 and the DSC 101 receive the signal "beacon" that has been transmitted from the display 102. In a similar way, in step S503, the display 102 and the DSC 101 receive the signal "beacon" that has been transmitted from the DV 103.

In step S504, the DSC 101 performs determination processing (hereinafter simply referred to as "first processing"). Note that the first processing will be described in detail later below with reference to FIG. 8.

In the first processing, the DSC 101 determines whether the DSC 101 has performed a communication with the wireless communication terminal that is a source of transmission of the signal "beacon" received in steps S502 and S503.

If it is determined in step S504 that the communication between the DSC 101 and the wireless communication terminal, which is the transmission source, has been performed before (YES in step S504), then the processing proceeds to step S505. On the other hand, if it is determined in step S504 that the communication between the DSC 101 and the wireless communication terminal, which is the transmission source, has not been performed before (NO in step S504), then, the DSC 101 does not proceed to the processing for communicating with the display 102 and the DV 103.

That is, in step S601, the ad hoc network created by the display 102 is kept.

In step S505, the DSC 101 creates a new ad hoc network by using the transmission rate defined by the IEEE802.11b standard.

The ad hoc network operates under the SSID of "Network1", which is the new ad hoc network created by the DSC 101 as described above.

Note that the display 102 and the DV 103 have not joined the ad hoc network in this state. That is, the ad hoc network whose SSID is "Network1" and the ad hoc network whose SSID is "Network2" coexist in this state.

In step S506, the DSC 101 notifies the signal "beacon". The display 102 and the DV 103 receive the signal "beacon" transmitted from the DSC 101.

Step S507 illustrates determination processing (hereinafter simply referred to as "second processing") performed by the display 102. Note that the second processing will be described in detail later below with reference to FIG. 9.

In step S507, the display 102 determines whether the display 102 has performed a communication with a wireless communication terminal before based on the signal "beacon" received in step S506.

If it is determined in step S507 that the display 102 has performed a communication with a wireless communication terminal before (YES in step S507), then the processing proceeds to step S508.

Figure 7:
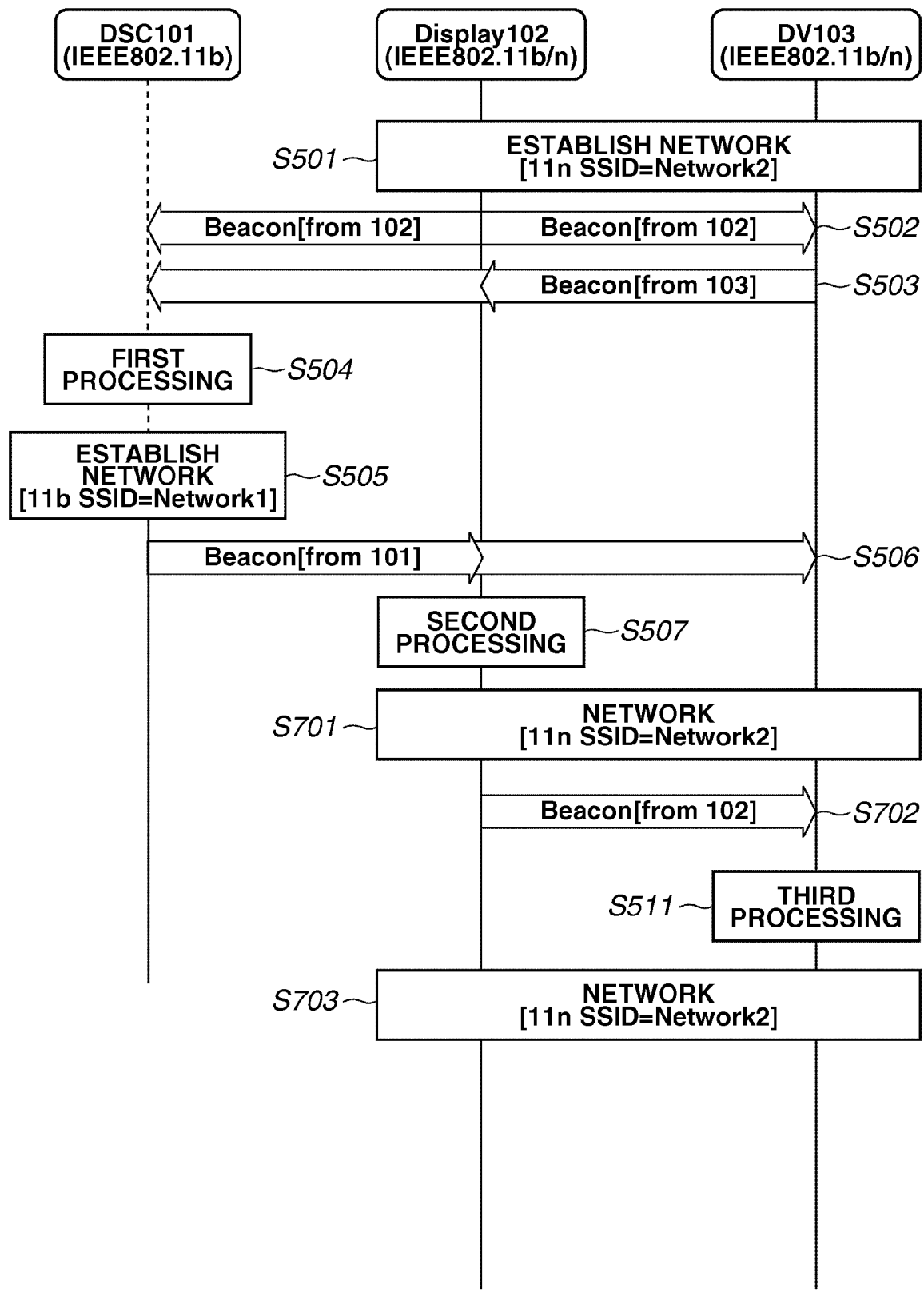
FIG. 7 illustrates an example of a flow of processing for reconstructing an ad hoc network in the communication system illustrated in FIG. 1 (Case 3) according to an exemplary embodiment of the present invention.

On the other hand, if it is determined in step S507 that the display 102 has not performed a communication with a wireless communication terminal before (NO in step S507), then the display 102 does not proceed to the processing for communicating with the DSC 101 as illustrated in FIG. 7. That is, in step S701, the ad hoc network created by the display 102 is remained.

In step S508, the display 102 switches the ad hoc network to join. More specifically, the display 102 switches (shifts) the connection from the ad hoc network whose SSID is "Network2", which has been created by the display 102, to the ad hoc network whose SSID is "Network1".

At this time, the display 102 changes the wireless communication setting from the transmission rate defined by the IEEE802.11n standard to the transmission rate defined by the IEEE802.11b standard. After that, the display 102 stops transmitting the signal "beacon" including the SSID of "Network2".

In step S509, the display 102 notifies the signal "beacon". The DSC 101 and the DV 103 receive the signal "beacon" transmitted from the display 102. At this time, the SSID included in the signal "beacon" is "Network1".

In step S510, the display 102 and the DSC 101 create an ad hoc network by using the transmission rate defined by the IEEE802.11b standard.

The ad hoc network operates under the SSID of "Network1", which is the ad hoc network created by the DSC 101 as described above and the display 102 joins the ad hoc network.

In step S511, the DV 103 performs determination processing (hereinafter simply referred to as "third processing"). Note that the third processing will be described in detail later below with reference to FIG. 10.

To briefly describe the third processing here, the DV 103 determines whether the DV 103 has performed a communication with the communication terminal that is the "beacon" signal transmission source before based on the signal "beacon" received in step S506. In addition, the DV 103 determines whether the SSID included in the signal "beacon" received in step S509, S702 is "Network2".

If it is determined in step S511 that the DV 103 has performed a communication with the communication terminal that is the "beacon" signal transmission source before and that the SSID included in the signal "beacon" received in step S509 is "Network1", (NO in step S511), then the processing proceeds to step S512.

On the other hand, if it is determined in step S511 that the DV 103 has not performed a communication with the communication terminal that is the "beacon" signal transmission source before or that the DV 103 has performed a communication with the communication terminal that is the "beacon" signal transmission source before but the SSID included in the signal "beacon" received in step S702 is "Network2", (YES in step S511), then the DV 103 does not proceed to the processing for communicating with the DSC 101 as illustrated in FIG. 7.

In this case, in step S703, the ad hoc network created by the display 102 is remained.

In step S512, the DV 103 shifts the ad hoc network to join. More specifically, the DV 103 shifts its connection to ad hoc network from the ad hoc network having the SSID of "Network2" and created by the display 102 (i.e., from the network the DV 103 is currently connected to) to the ad hoc network having the SSID of "Network1".

Accordingly, the wireless communication setting is changed from the transmission rate defined by the IEEE802.11n standard to the transmission rate defined by the IEEE802.11b standard. After that, the DV 103 stops the transmission of the signal "beacon" including the SSID "Network2".

In step S513, the DV 103 notifies the signal "beacon". The DSC 101 and the display 102 receive the signal "beacon" transmitted from the DV 103. In this case, the SSID of "Network1" is included in the signal "beacon".

In step S514, the DV 103 creates an ad hoc network with the display 102 and the DSC 101 by using the transmission rate defined in the IEEE802.11b standard. The ad hoc network operates under the SSID of "Network1", which is the ad hoc network created by the DSC 101.

The DV 103 joins the ad hoc network. Thus, the network between the display 102 and the DSC 101 is created.

Next, processing performed in steps S504, S507, and S511 (FIG. 5) will be described in detail below with reference to FIGS. 8 through 10.

To begin with, the first processing performed in step S504 of FIG. 5 will be described below with reference to FIG. 8. When the DSC 101 has received the signal "beacon" from the display 102 or the DV 103, the processing starts.

Note that as described above, each determination processing illustrated in FIG. 8 (i.e., processing illustrated in a rhombic rectangle and indicating a condition for each determination processing) is performed with the first determination unit 212.

Referring to FIG. 8, in step S801, the DSC 101 checks history information stored on the storage unit 209.

As described above, the history information includes the content of the previously performed communication, the time information including information about the date and time of communication, and information about the type of the transmitted data. The time information includes information about the date and time of communication that has already been acquired from the clock/timer unit 210 and stored on the storage unit 209 as the history information.

In step S802, the DSC 101 determines whether the MAC address of the transmission source, which is contained in the signal "beacon" received from the display 102 or the DV 103, is included in the checked history information.

If it is determined in step S802 that the MAC address of the transmission source included in the signal "beacon" received from the display 102 or the DV 103 is included in the checked history information (YES in step S802), then the processing proceeds to step S803. On the other hand, if it is determined in step S802 that the MAC address is not included in the checked history information (NO in step S802), then, the first processing ends.

In step S803, the DSC 101 determines whether the DSC 101 has set a parameter for a communication with the communication terminal of the "beacon" signal transmission source before.

If it is determined in step S803 that the DSC 101 has set a parameter for a communication with the communication terminal of the "beacon" signal transmission source before (i.e., if it is determined in step S803 that the history information includes a history of having actually performed a communication with the "beacon" signal transmission source communication terminal before) (YES in step S803), then the processing proceeds to step S804. On the other hand, if it is determined in step S803 that the DSC 101 has not set a parameter for a communication with the communication terminal of the "beacon" signal transmission source before (i.e., if it is determined in step S803 that the history information does not include a history of having actually performed a communication with the "beacon" signal transmission source communication terminal before) (NO in step S803), then, the first processing ends.

It is also useful if the time (the date and time) of performing the wireless communication for the last time is used as a condition for the determination.

For example, it is also useful for the DSC 101 to determine that the DSC 101 has not performed a communication with the communication terminal of the "beacon" signal transmission source before if DSC 101 has not performed a communication with the terminal for a predetermined time since the last wireless communication has performed therewith.

To this end, a threshold value can be set for a difference of the time between the date and time of the last wireless communication and the present date and time to determine whether the difference is within the threshold value.

In step S804, the DSC 101 creates a new ad hoc network according to the IEEE802.11b standard. That is, the DSC 101 creates a new ad hoc network whose SSID is "Network1".

Note that the new ad hoc network is created under control of the first communication control unit 213.

Next, the second processing performed in step S507 of FIG. 5 will be described below with reference to FIG. 9. When the display 102 has received the signal "beacon" from the DSC 101, the processing starts.

Note that each determination processing illustrated in FIG. 9 is performed with the second determination unit 312.

Referring to FIG. 9, in step S901, the display 102 checks the history information stored on a storage unit 309.

As described above, the history information includes the content of the previously performed communication, the time information including information about the date and time of communication, and information about the type of the transmitted data. The time information includes information about the date and time of communication that has already been acquired from the clock/timer unit 310 and stored on the storage unit 309 as the history information.

In step S902, the display 102 determines whether the MAC address of the transmission source, which is contained in the signal "beacon" received from the DSC 101, is included in the checked history information.

If it is determined in step S902 that the MAC address of the transmission source included in the signal "beacon" received from the DSC 101 is included in the checked history information (YES in step S902), then the processing proceeds to step S903. On the other hand, if it is determined in step S902 that the MAC address of the transmission source included in the signal "beacon" received from the DSC 101 is not included in the checked history information (NO in step S902), then the second processing ends.

In step S903, the display 102 determines whether the display 102 has set a parameter for a communication with the communication terminal of the "beacon" signal transmission source before.

It is determined according to the checked history information.

If it is determined in step S903 that the display 102 has set a parameter for a communication with the "beacon" signal transmission source communication terminal before (i.e., if it is determined in step S903 that the history information includes a history of having actually performed a communication with the "beacon" signal transmission source communication terminal before) (YES in step S903), then the processing proceeds to step S904.

On the other hand, if it is determined in step S903 that the display 102 has not set a parameter for a communication with the communication terminal of the "beacon" signal transmission source before (i.e., if it is determined in step S903 that the history information does not include a history of having actually performed a communication with the "beacon" signal transmission source communication terminal before) (NO in step S903), then the second processing ends.

It is also useful if the time (the date and time) of performing the wireless communication for the last time is used as a condition for the determination, as in the case of the processing illustrated in FIG. 8.

In step S904, the display 102 determines whether a data communication with the DV 103 is currently performed.

If it is determined in step S904 that the data communication with the DV 103 is not currently performed (NO in step S904), then the processing proceeds to step S905.

On the other hand, if it is determined in step S904 that the data communication with the DV 103 is currently performed (YES in step S904), then the second processing ends.

The data communication is performed, for example, by the operation of a specific application. In this case, whether the data communication is currently performed can be determined according to an operation status of the specific application.

In step S905, the display 102 determines whether there is a history indicating that a highly significant communication with the DSC 101 has been performed.

If it is determined in step S905 that there is a history indicating that a highly significant communication with the DSC 101 has been performed (YES in step S905), then the processing proceeds to step S906.

On the other hand, if it is determined that there is not a history indicating that a highly significant communication with the DSC 101 has been performed (NO in step S905), then the second processing ends.

More specifically, for example, the display 102 determines that there is a history of a highly significant communication, if there is, for example, a history of a mobile communication with the DSC 101 in which the data is lost if the data communication fails.

In step S906, the display 102 determines the operation mode of the display 102 itself (i.e., determines whether the display 102 is in a communication mode).

If it is determined in step S906 that the display 102 is in a communication mode for transmitting file data to and from the DV 103 (YES in step S906), then the processing proceeds to step S907.

On the other hand, if it is determined in step S906 that the display 102 is not in a communication mode for transmitting file data to and from the DV 103 (NO in step S906), then the second processing ends.

In step S907, the display 102 determines whether the user has issued an instruction for shifting to another ad hoc network. More specifically, in step S907, the display 102 determines whether the user has issued an instruction for performing a wireless communication with the DSC 101.

If it is determined in step S907 that the user has issued an instruction for performing a wireless communication with the DSC 101 (YES in step S907), then the processing proceeds to step S908.

On the other hand, if it is determined that the user has not issued an instruction for performing a wireless communication with the DSC 101 (NO in step S907), then the second processing ends.

Figure 3:
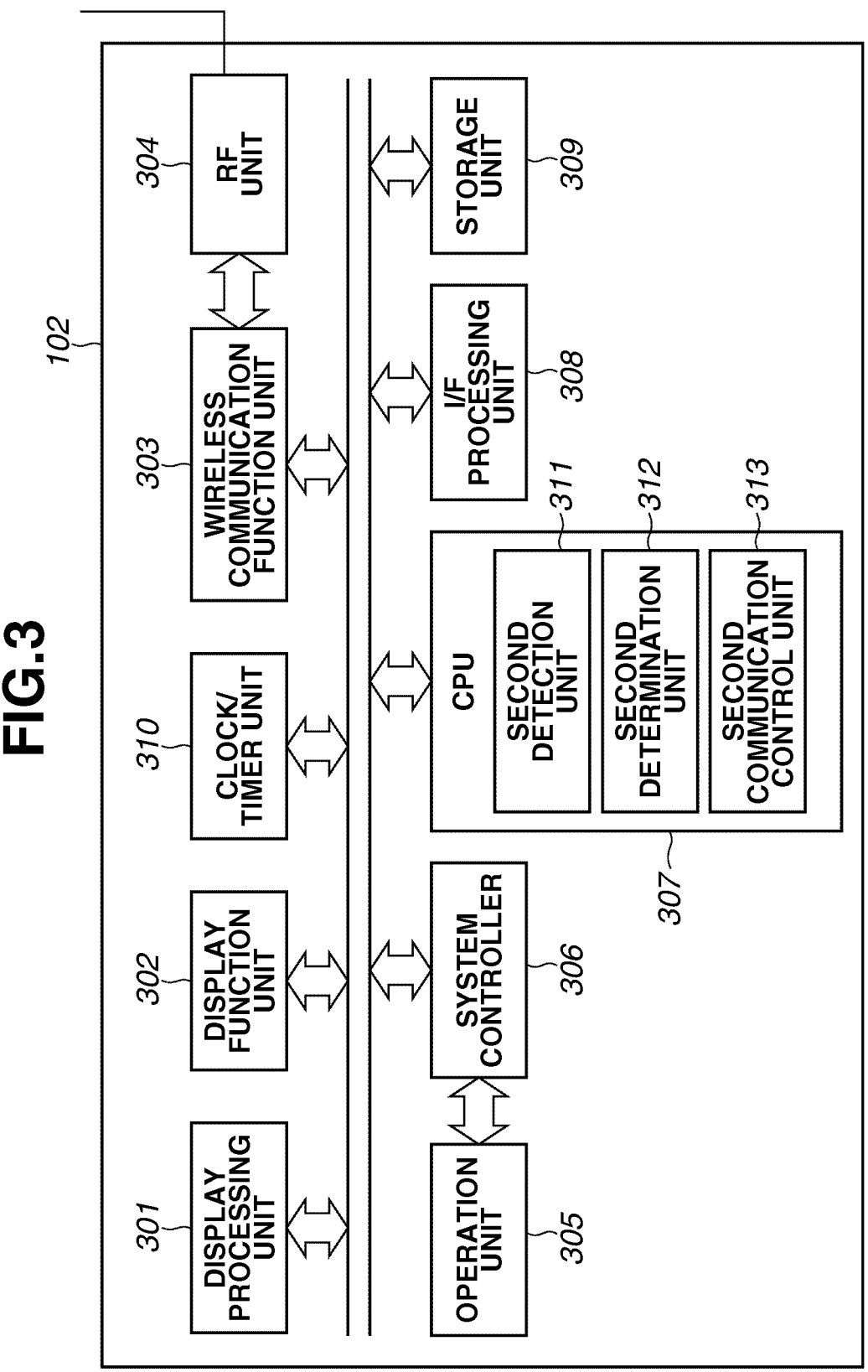
FIG. 3 illustrates an exemplary functional configuration of a display illustrated in FIG. 1 according to an exemplary embodiment of the present invention.

The user issues the instruction via an operation unit 305 (FIG. 3) and the user instruction is notified to a CPU 307 (FIG. 3) via a system controller 306 (FIG. 3). Furthermore, the display 102 displays information indicating that the "beacon" signal has been received from the DSC 101 by using a display processing unit 301 (FIG. 3) to notify the user of the status information.

In step S908, the display 102 shifts the connection from the adhoc network complying with the IEEE802.11n standard, in which the display 102 currently participates, to the new ad hoc network created in compliance with the IEEE802.11b standard.

More specifically, in step S908, the display 102 discontinues the network that has been created by the display 102 and joins the ad hoc network whose SSID is "Network1", which has been created by the DSC 101. The shifting of connection from the current ad hoc network to the newly created ad hoc network is performed under control of the second communication control unit 313.

In the present exemplary embodiment, the processing in steps S904 through S907 illustrated in FIG. 9 is performed in the above-described order. However, the present exemplary embodiment is not limited to this. That is, the processing in steps S904 through S907 can be performed in another order.

Furthermore, it is not always necessary to perform all of the processing in steps S904 through S907 and that any of the processing in steps S904 through S907 can be omitted. Moreover, it is also useful that another determination processing is performed in addition to the above-described processing in steps S904 through S907.

Next, the third processing in step S511 of FIG. 5 will be described in detail below with reference to FIG. 10.

When the DV 103 has received the signal "beacon" from the DSC 101 and the display 102, the processing starts.

Each determination processing illustrated in FIG. 10 (i.e., processing illustrated in a rhombic rectangle and indicating a condition for each determination processing) is performed with the third determination unit 412.

Referring to FIG. 10, in step S1001, the DV 103 determines whether the SSID included in the signal "beacon" received from the display 102 is "Network2".

If it is determined in step S1001 that the SSID included in the signal "beacon" received from the display 102 is "Network2" (YES in step S1001), then the third processing ends. On the other hand, if it is determined in step S1001 that the SSID included in the signal "beacon" received from the display 102 is not "Network2" (NO in step S1001), then the processing proceeds to step S1002.

More specifically, in step S1001, the DV 103 determines whether the display 102 currently continues the ad hoc network whose SSID is "Network2", which the display 102 has created by itself, according to the signal "beacon" received from the display 102.

In step S1002, the DV 103 determines whether the SSID included in the signal "beacon" received from the display 102 is "Network1".

If it is determined in step S1002 that the SSID included in the signal "beacon" received from the display 102 is "Network1" (YES in step S1002), then the processing proceeds to step S1003. On the other hand, if it is determined in step S1002 that the SSID included in the signal "beacon" received from the display 102 is not "Network1" (NO in step S1002), then the processing returns to step S1001.

More specifically, in step S1002, the DV 103 determines whether the display 102 has shifted its connection to the ad hoc network whose SSID is "Network1", which has been created by the DSC 101, according to the signal "beacon" received from the display 102.

Figure 4:
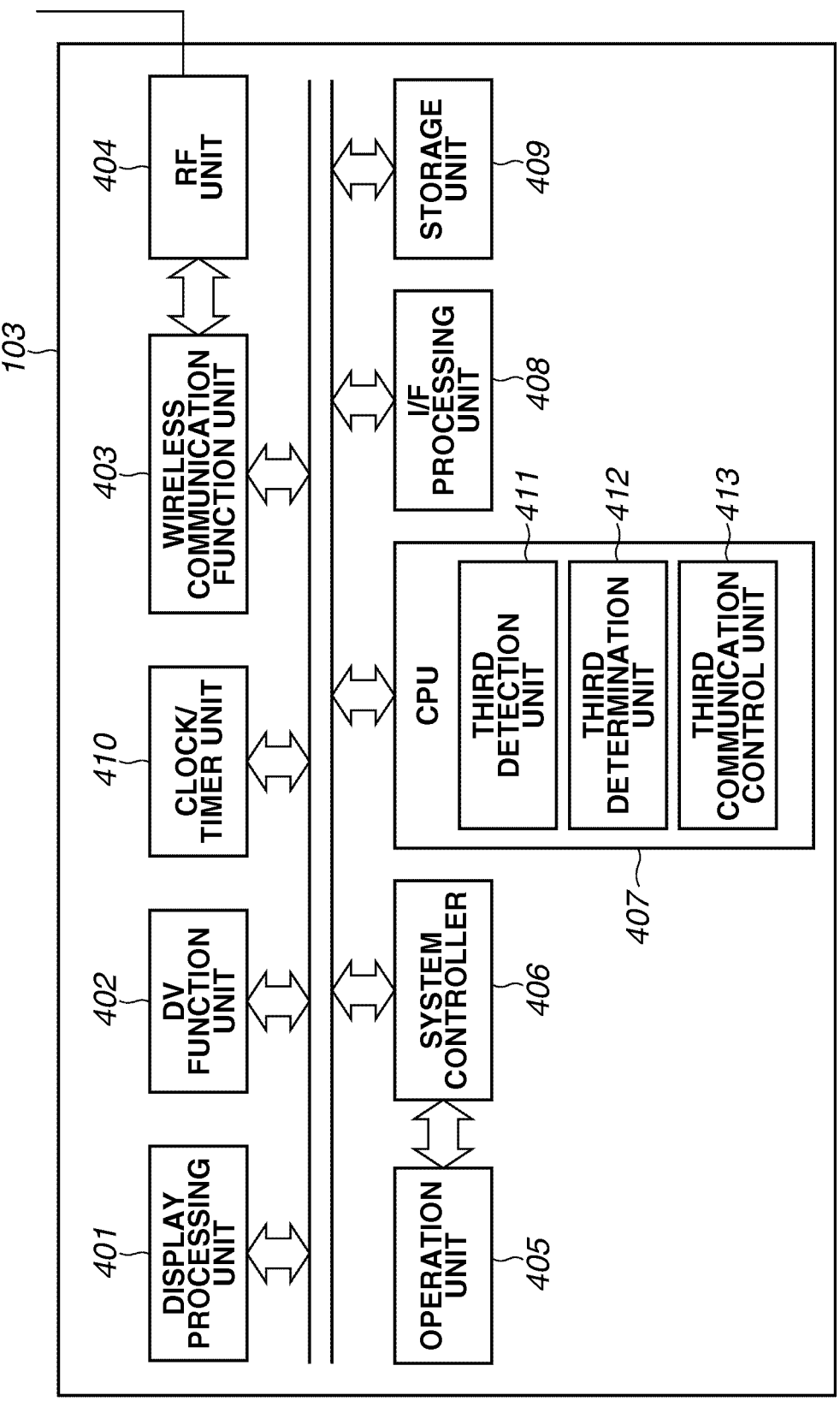
FIG. 4 illustrates an exemplary functional configuration of a digital video camera illustrated in FIG. 1 according to an exemplary embodiment of the present invention.

In step S1003, the DV 103 checks the history information stored on a storage unit 409 (refer to FIG. 4).

As described above, the history information includes the content of the previously performed communication, the time information including information about the date and time of communication, and information about the type of the transmitted data. The time information includes information about the date and time of communication that has already been acquired from a clock/timer unit 410 (refer to FIG. 4) and stored on the storage unit 409 (refer to FIG. 4) as the history information.

In step S1004, the DV 103 determines whether the MAC address of the transmission source contained in the signal "beacon" received from the DSC 101 is included in the checked history information.

If it is determined in step S1004 that the MAC address of the transmission source, which is contained in the signal "beacon" received from the DSC 101, is included in the checked history information (YES in step S1004), then the processing proceeds to step S1005. On the other hand, if it is determined in step S1004 that the MAC address of the transmission source, which is contained in the signal "beacon" received from the DSC 101, is not included in the checked history information (NO in step S1004), then the third processing ends.

In step S1005, the DV 103 determines whether the DV 103 has set a parameter for a communication with the communication terminal of the "beacon" signal transmission source before.

If it is determined in step S1005 that the DV 103 has set a parameter for a communication with the communication terminal of the "beacon" signal transmission source before (i.e., if it is determined in step S1005 that the history information includes a history of having actually performed a communication with the communication terminal of the "beacon" signal transmission source before) (YES in step S1005), then the processing proceeds to step S1006.

On the other hand, if it is determined in step S1005 that the DV 103 has not set a parameter for a communication with the communication terminal of the "beacon" signal transmission source before (NO in step S1005), then the third processing ends.

It is also useful if the time (the date and time) of performing the wireless communication for the last time is used as a condition for the determination, as described above in step S803 of FIG. 8.

In step S1006, the DV 103 determines whether a data communication with the display 102 is currently performed.

If it is determined in step S1006 that the data communication with the display 102 is not currently performed (NO in step S1006), then the processing proceeds to step S1007.

On the other hand, if it is determined in step S1006 that the data communication with the display 102 is not currently performed (YES in step S1006), then the third processing ends.

The data communication is performed, for example, by the operation of a specific application. In this case, whether the data communication is currently performed can be determined according to an operation status of the specific application.

In step S1007, the DV 103 determines whether there is a history indicating that a highly significant communication with the DSC 101 has been performed.

If it is determined in step S1007 that there is a history indicating that a highly significant communication with the DSC 101 has been performed (YES in step S1007), then the processing proceeds to step S1008.

On the other hand, if it is determined in step S1007 that there is not a history indicating that a highly significant communication with the DSC 101 has been performed (NO in step S1007), then the third processing ends.

More specifically, for example, the DV 103 determines that there is a history of a highly significant communication, if there is, for example, a mobile communication with the DSC 101 in which the very data is lost if the data communication fails.

In step S1008, the DV 103 determines the operation mode of the DV 103 itself (determines whether the DV 103 is in a communication mode).

If it is determined in step S1008 that the DV 103 is in a communication mode for transmitting file data to and from the display 102 (YES in step S1008), then the processing proceeds to step S1009.

On the other hand, if it is determined in step S1008 that the DV 103 is not in a communication mode for transmitting file data to and from the display 102 (NO in step S1008), then the third processing ends.

In step S1009, the display 102 determines whether the user has issued an instruction for shifting to another ad hoc network. More specifically, in step S1009, the DV 103 determines whether the user has issued an instruction for performing a wireless communication with the DSC 101.

If it is determined in step S1009 that the user has issued an instruction for shifting to another ad hoc network (i.e., the user has issued an instruction for performing a wireless communication with the DSC 101) (YES in step S1009), then the processing proceeds to step S1010.

On the other hand, if it is determined in step S1009 that the user has not issued an instruction for shifting to another ad hoc network (NO in step S1009), then the third processing ends.

The user issues the instruction via an operation unit 405 (refer to FIG. 4) and the user instruction is notified to a CPU 407 via a system controller 406. Furthermore, the DV 103 displays information indicating that the "beacon" signal has been received from the DSC 101 by using a display processing unit 401 to notify the user of the status information.

In step S1010, the DV 103 shifts the connection from the ad hoc network in compliance with the IEEE802.11n standard, in which the DV 103 currently participates, to the new ad hoc network created in compliance with the IEEE802.11b standard. More specifically, in step S1010, the DV 103 joins the ad hoc network whose SSID is "Network1", which has been created by the DSC 101.

The shifting of connection from the current ad hoc network to the newly created ad hoc network is performed under control of the second communication control unit 413.

In the present exemplary embodiment, the processing in steps S1006 through S1009 illustrated in FIG. 10 is performed in the above-described order. However, the present exemplary embodiment is not limited to this. That is, the processing in steps S1006 through S1009 can be performed in another order.

Furthermore, it is not always necessary to perform all of the processing in steps S1006 through S1009 and any of the processing in steps S1006 through S1009 can be omitted. Moreover, it is also useful that another determination processing is performed in addition to the above-described processing in steps S1006 through S1009.

Furthermore, as described above, the present exemplary embodiment starts the processing, illustrated in FIG. 10, when the signal "beacon" is received from the display 102 or the like. However, the present exemplary embodiment is not limited to this.

That is, it is also useful, for example, that the present exemplary embodiment starts the processing, illustrated in FIG. 10 (the processing in step S1003 and subsequent steps), if the signal "beacon" including the SSID "Network2" has not been received from the display 102 or the like for a predetermined time.

With the above-described configuration, the present exemplary embodiment can reconstruct the network according to the communication history even if a communication terminal not in compliance with the communication method used in an existing ad hoc network has issued a request for joining the existing ad hoc network.

The exemplary embodiment of the present invention is as described above. The present invention can be implemented in a system, an apparatus, a method, a program, or a storage medium storing the program, for example. More specifically, the present invention can be applied to a system including a plurality of devices and to an apparatus that includes one device.

Note that the present invention can be implemented by directly or remotely supplying a program of software implementing functions of the above-described exemplary embodiments (in the exemplary embodiments, the program corresponding to the processing performed according to the flow charts of FIGS. 5 through 10) to a system or an apparatus and reading and executing supplied program codes with the system or a computer of the apparatus.

Accordingly, the program code itself, which is installed in the computer for implementing the functional processing of the present invention with the computer, achieves the present invention. That is, the present invention also includes the computer program implementing the functional processing of the present invention.

Accordingly, the program can be configured in any form, such as object code, a program executed by an interpreter, and script data to be supplied to an operating system (OS).

As the recording medium for supplying such program code, a floppy disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a ROM, and a digital versatile disk (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk. The functions of the above embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium such as a CD-ROM and the like which stores the encrypted program according to the present invention, and by allowing the user who is qualified for a prescribed condition to download key information for decoding the encrypted program from the web site via the Internet, and by executing and installing in the computer the encrypted program code by using the key information.

In addition, the functions according to the embodiments described above can be implemented not only by executing the program code read by the computer, but also implemented by the processing in which an OS or the like performs a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-003640 filed Jan. 10, 2008, which is hereby incorporated by reference herein in its entirety.

What is claimed is:

1. A communication system comprising:
a first communication terminal configured to comply with a plurality of communication methods; and
a second communication terminal configured to comply with any one of the plurality of communication methods that the first communication terminal complies with, wherein the first communication terminal includes:
a reception unit configured to receive a signal from the second communication terminal, which communicates by a first communication method, in a case that the first communication terminal is in a network of a second communication method;
a checking unit configured to check history information to determine whether or not the first communication terminal and the second communication terminal have previously communicated, in a case that the reception unit receives the signal; and
a control unit configured to cause the first communication terminal, which communicates by the second communication method, to communicate with the second communication terminal by the first communication method based on a result of checking history information by the checking unit.

2. A communication terminal comprising:
a reception unit configured to receive a signal from another communication terminal, which communicates by a first communication method, in a case that the communication terminal is in a network of a second communication method;
a checking unit configured to check history information to determine whether or not the communication terminal and the another communication terminal have previously communicated, in a case that the reception unit receives the signal; and
a control unit configured to cause the communication terminal, which communicates by the second communication method, to communicate with the another communication terminal by the first communication method based on a result of checking history information by the checking unit.

3. The communication terminal according to claim 2, wherein the control unit is configured to cause the communication terminal, which communicates by the second communication method, to communicate by the first communication method if it is determined that the communication terminal has previously communicated with the another communication terminal based on the result of checking history information by the checking unit.

4. The communication terminal according to claim 2, wherein the control unit is configured to continue communicating by the second communication method if it is determined that the communication terminal has not previously communicated with the another communication terminal based on the result of checking history information by the checking unit.

5. The communication terminal according to claim 2, wherein the control unit is configured to cause the communication terminal, which communicates by the second communication method, to communicate by the first communication method if it is determined, based on the result of checking history information by the checking unit, that the communication terminal has previously communicated with the another communication terminal and that the communication terminal has not received the signal including the first communication method for a predetermined time.

6. The communication terminal according to claim 2, further comprising a determination unit configured to determine whether or not the communication terminal is sending data by the second communication method, wherein the control unit is, if it is determined by the determination unit that the communication terminal is sending data by the second communication method, configured to continue the communication by the second communication method.

7. The communication terminal according to claim 2, wherein the control unit is configured to continue the communication by the second communication method, if the communication terminal has not communicated with the another communication terminal for a predetermined time based on the result of checking history information by the checking unit.

8. The communication terminal according to claim 2, further comprising:
 a creating unit configured to create a network of the second communication method,
 wherein the reception unit receives the signal in a case that the communication terminal is in the network created by the creating unit.

9. A communication terminal configured to communicate with another communication terminal in compliance with a plurality of communication methods, the communication terminal comprising:
 a reception unit configured to receive a notification signal from the another communication terminal in a case that the another communication terminal creates a first network in compliance with a communication method that the communication terminal does not comply with;
 a checking unit configured to check history information to determine whether or not the communication terminal and the another communication terminal have previously communicated, based on the notification signal; and
 a creating unit configured to create a second network which the communication terminal complies with and to send a notification signal about the second network based on a result of checking history information by the checking unit.

10. The communication terminal according to claim 9, wherein the creating unit creates the second network in a case that the communication terminal has previously communicated with the another communication terminal based on the result of checking history information by the checking unit.

11. The communication terminal according to claim 9, wherein the creating unit does not to create the second network, in a case that the communication terminal has not previously communicated with the another communication terminal based on the result of checking history information by the checking unit.

12. The communication terminal according to claim 9, further comprising a determination unit configured to determine that the communication terminal has not previously communicated with the another communication terminal when the communication terminal has not communicated with the another communication terminal for a predetermined time based on the result of checking history information by the checking unit.

13. A method for a communication terminal, the method comprising:
 receiving a signal from another communication terminal which communicates by a first communication method, in a case that the communication terminal is in a network of a second communication method;
 checking history information to determine whether or not the communication terminal and the another communication terminal have previously communicated, in a case that the signal is received; and
 controlling the communication terminal, which communicates by the second communication method, to communicate with the another communication terminal by the first communication method based on a result of checking history information.

14. A method for a communication terminal that communicates with another communication terminal that complies with a plurality of communication methods, the method comprising:
 receiving a notification signal from the another communication terminal in a case that the another communication terminal creates a first network in compliance with a communication method that the communication terminal does not comply with;
 checking history information to determine whether or not the communication terminal and the another communication terminal have previously communicated, based on the notification signal;
 creating a second network which the communication terminal complies with; and
 sending a notification signal about the second network based on a result of checking history information.

15. A non-transitory computer-readable storage medium storing instructions for causing a communication terminal to perform a communication method comprising:
 receiving a signal from another communication terminal, which communicates by a first communication method, in a case that the communication terminal is in a network of a second communication method;
 checking history information to determine whether or not the communication terminal and the another communication terminal have previously communicated, in a case that the signal is received; and
 controlling the communication terminal, which communicates by the second communication method, to communicate by the first communication method based on a result of checking history information.

16. A non-transitory computer-readable storage medium storing instructions for causing a communication terminal that communicates with another communication terminal that complies with a plurality of communication methods to perform a communication method comprising:
 receiving a notification signal from the another communication terminal in a case that the another communication terminal creates a first network in compliance with a communication method that the communication terminal does not comply with;
 checking history information to determine whether or not the communication terminal and the another communication terminal have previously communicated, based on the notification signal;
 creating a second network which the communication terminal complies with; and
 sending a notification signal about the second network based on a result of checking history information.

* * * * *